W. H. WATKINS.
AERIAL ROPEWAY AND THE LIKE.
APPLICATION FILED OCT. 28, 1918.
1,313,357.
Patented Aug. 19, 1919.
2 SHEETS—SHEET 1.
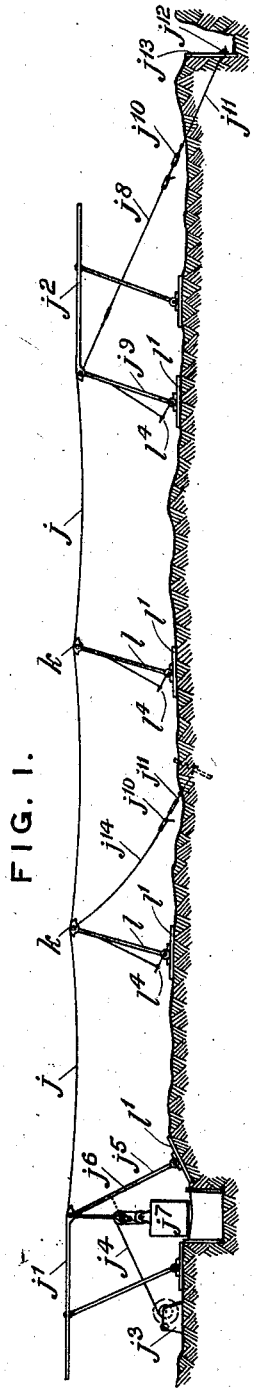
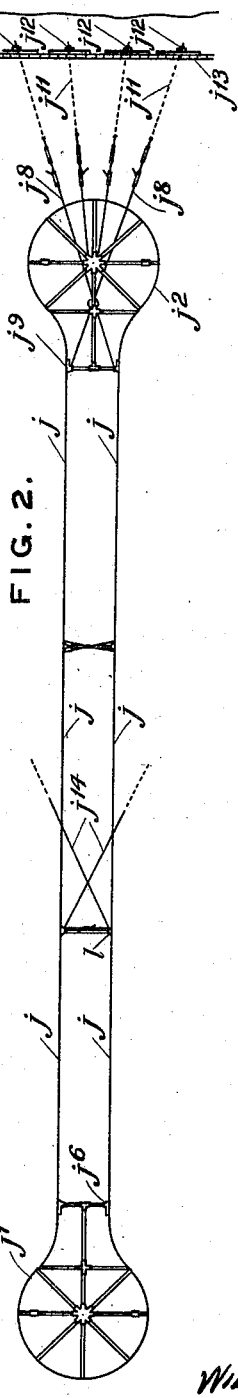
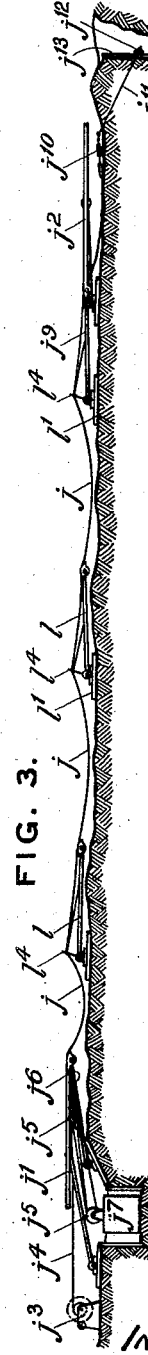
INVENTOR
WILLIAM H. WATKINS
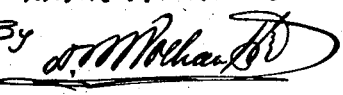

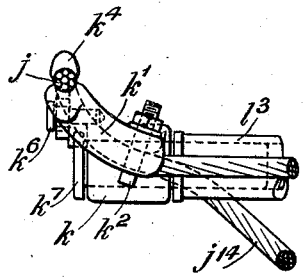
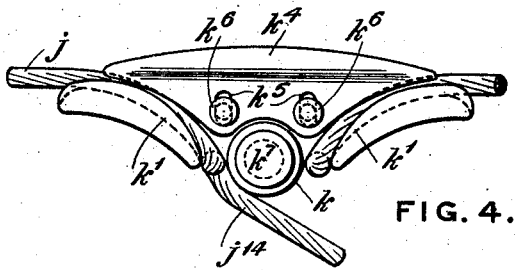
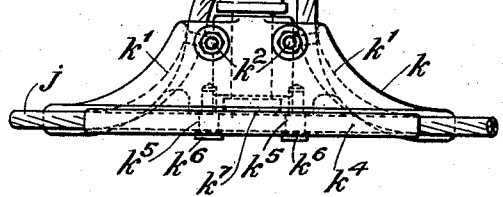
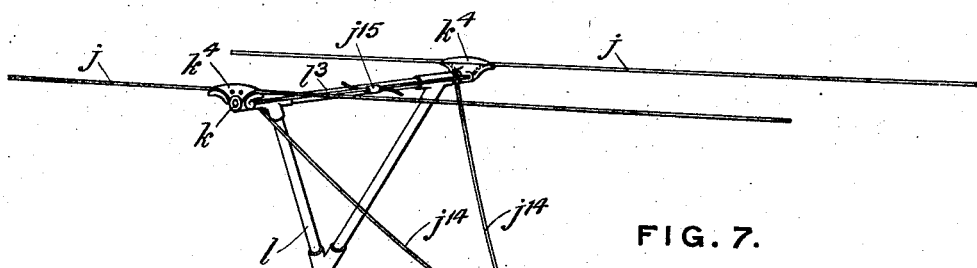
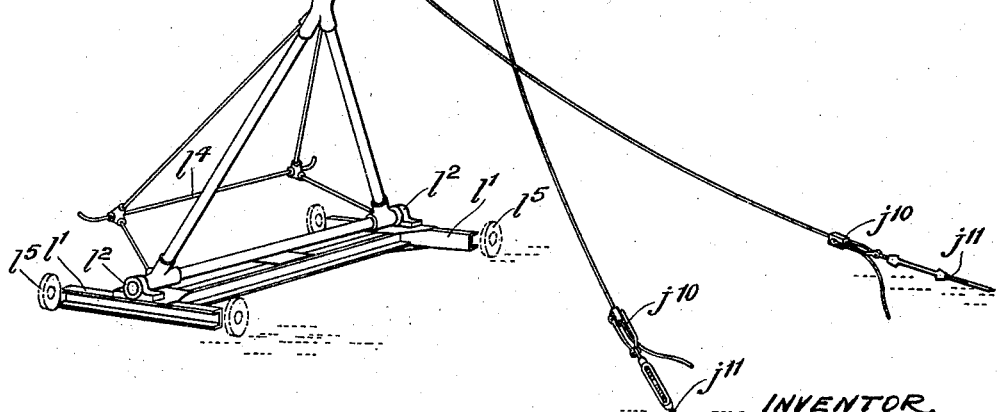

UNITED STATES PATENT OFFICE.

WILLIAM HUGH WATKINS, OF HANWELL, ENGLAND.

AERIAL ROPEWAY AND THE LIKE.

1,313,357. Specification of Letters Patent. Patented Aug. 19, 1919.

Application filed October 28, 1918. Serial No. 260,040.

*To all whom it may concern:*

Be it known that I, WILLIAM HUGH WATKINS, a subject of the King of Great Britain and Ireland, and a resident of Hanwell, county of Middlesex, England, have invented certain new and useful Improvements in Aerial Ropeways and the like, of which the following is a specification.

The present invention has reference to and comprises a new or improved method of transporting materials, and embraces improvements in aerial ropeways and the like systems.

The object of the invention is to provide, by a series of improvements, a simple, economical and quickly installed means for expeditiously transporting light loads over obstacles or rough country; which, while being of general utility, shall be applicable and adapted to military requirements, the track system being designed with a view to portability, and its concealment from the enemy during daylight or when not in use, to be rapidly collapsed to the ground at will, and likewise elevated into the working position, to have few vital working parts, and to demand a minimum of manual labor and bodily exposure in its installation and operation.

In carrying into practice the improvements of this invention, I preferably employ for a forward and return track line system, with intermediately the inclusion for track connecting compensation, and remote outstanding ends for safety guys, sectional or span lengths of steel wire rope in duplicate; and a supporting unit for the track ropes, consisting of a base or ground frame, constructed preferably of rolled steel sections; to which is pivoted with its axis at right angles to the track, a rigid standard or support, functionally, jib or derrick-like, preferably built up of tubular or other rolled steel sections; the crosshead of the said standard having attached at each extremity, with its axis also at right angles to the track, a pivotally mounted oscillating saddle, preferably a steel casting, having opposed grooves for supporting and retaining the ends of the adjoining spans of track rope, the said grooves being curved to a compound radius so as to lead the ropes downward and inward, with provision for their adjustable fixation; the saddle also incorporating a vertically depressible rigid rail member, preferably of steel, for the purpose of bridging up the consecutive spans of rope track adjacent in the saddle. A series assembly of the foregoing track supporting units and the consecutive spans of rope track thereto, may be accomplished in the "collapsed to the ground" position of the whole; and in the case of a span about to be completed, the rope is passed over an auxiliary leverage strut at the foot of the standard, and then secured at the saddle, and the rope ends relative to this span, may be carried beyond their respective oscillating saddles, crossed and brought forward and secured by rope grips to screw-adjusted anchorages to the ground, in a position approximately beneath their respective track duplicates: the included lengths of these ropes beyond the saddles being such as to permit the pivoted supporting standards to assume a position which, when the ropes are taut and acting as safety guys, is slightly out of the vertical, and inclined toward the direction of progress of the installation of the track, being the direction in which the supporting standards are intended to be collapsed from the elevated and working position, and is the position of assemblage.

The base or ground frames of the track rope supporting units are preferably provided with small road wheels with their axes normal to the rope track, for convenience in moving the said frames locally to the desired position, and to permit of an initial lateral adaptation of the standards in bringing the track system within the limits of a workably straight line; the base frames are then made to bear by displacing the wheels, and may be further secured by spikes driven into the ground.

Each terminus comprises a like pivotally supported rigid rail track, curved so as to form a returning loop for connecting up the twin rope track and thus to constitute a continuous track system. One of the termini is provided with the track raising and tensioning winch incorporating a rope reeving system with a tension-maintaining balance weight, and the remote terminus is provided with the main anchorage guys, which are arranged radially from the terminus and secured by rope grips and screw adjustable connections to horizontal beams, preferably of rolled steel sections, bearing on vertically disposed timber or other reinforcement in a trench system or special excavation, the main anchorage guys being of such a number and disposition as to distribute the sustaining tension of the track system over the requisite safe bearing area of the excavated ground.

As hereinbefore mentioned, the fixed anchorage guys proper to the rope track system as a whole, are those of the remote terminus, the last to be assembled, and when at the completion of the raising of the track from the ground, these are pulled taut by the tension exerted in elevating and retaining the track system, obtained by the winch element, and automatically maintained by the suspended ballast, jointly situated at the first terminus to be erected, and intermediately if local conditions necessitate, the safety guys throughout the system remain slightly sagged: thus preserving flexibility and the maintenance of uniform tension throughout the track line by virtue of the pivotal and oscillatory system of supporting.

A completed track system is thus assembled in a collapsed position close to the surface of the ground, and to which position it can be rapidly lowered at will, from the raised and comparatively low elevated working position occupied when visibility conditions, as at night, favor transportation.

And in order that others may clearly understand how my invention is carried into effect and practice, reference is to be had to the following description and the hereunto appended sheet of drawings, in which:—

Figures 1, 2 and 3 are, respectively, views of an elevated track system, a plan view thereof, and a collapsed track system.

Figs. 4, 5 and 6 are, respectively, an elevation, plan and side elevation of an oscillating saddle showing the means for the fixation of the track rope thereto, and the depressible rigid rail bridging member.

Fig. 7 is a perspective view of a track support complete, and with safety guys.

As illustrated by Figs. 1, 2 and 3, $j$ is the sectional or span lengths of rope forming a duplicate, parallel or twin track, and is secured to the oscillating saddles $k$ and supported by the portable rigid standards $l$ which are pivoted to base, or ground frames $l^1$.

$j^1$ and $j^2$ are respectively the rigid rail looping termini for connecting up the twin track ropes to constitute a continuous track system. The terminus $j^1$ has winch means $j^3$ with its winding rope $j^4$ embracing a rope pulley reeving system $j^5$, which pulley system $j^5$ is connected to the crosshead of the rope terminal support $j^6$ and suspends a ballast-box or balance weight $j^7$, said balance weight $j^7$ being predetermined to afford the required tension in the track system. The remote terminus $j^2$ is provided with the main anchorage guys $j^8$ which radiate from the crosshead of the rope terminal support $j^9$, said guys $j^8$ being secured by rope grips $j^{10}$ to screw adjustment anchorage ties $j^{11}$ and made fast by being secured to longitudinal beams $j^{12}$, bearing on vertically disposed timbering $j^{13}$, in an entrenchment or special excavation, or made fast to any other suitable anchorage. Intermediate safety guys $j^{14}$ may be employed where so desired, but are normally slack and serve the object of preventing the supports $l$ from inclining in the reverse direction. The working tension of the track system as a whole is sustained by the beforementioned main anchorage guys $j^8$ and maintained by the balance weight $j^7$.

It will be readily understood that if the winch $j^3$ pays out its winding rope $j^4$, the pulley system $j^5$ lowers the balance weight $j^7$ until said balance weight rests on the ground, and thus relieves the working tension in the track system; and further paying out of the winding rope $j^4$ by the winch $j^3$ causes the entire system of elevated track to be lowered to the ground under the control of the winch, and to occupy the collapsed position as illustrated by way of example in Fig. 3.

From the foregoing description it will be obvious that the strain throughout the track rope system is maintained at a predetermined and uniform tension, by virtue of the oscillatory and pivotal manner of supporting, when the track is raised to the elevated and working position, by the winding in of the rope $j^4$ by the winch $j^3$, and the resulting suspension of the balance weight $j^7$.

In Figs. 4, 5 and 6, $k$ is the oscillating saddle casting, having as means for supporting and retaining the track ropes $j$, the opposed rope grooves $k^1$, which are curved to a compound radius so as to lead the ropes $j$ downward and inward, and the said saddle casting $k$ is provided with hookbolt means $k^2$ for the purpose of the adjustable fixation of the rope $j$ within the rope grooves $k^1$. The saddle casting $k$ is also provided with a separate and rigid depressible bridging rail member $k^4$, which bridging rail $k^4$ is slidably mounted by its guiding slots $k^5$ and the headed pins $k^6$ to the saddle casting $k$. The saddle also incorporates, as means for its oscillation, the loose-fitting pin $k^7$, said pin $k^7$ being screwed or otherwise secured to the crosshead $l^3$ of the track support $l$.

I do not confine myself to the particular form or manner described of adjustably fixing the rope $j$ within the rope grooves $k^1$; as I may use any other or additional suitable means of securing the said rope $j$ to the saddle $k$.

Referring now to Fig. 7, $l$ is a rigid standard or support, preferably constructed of tubular steel sections, the said standard $l$ is pivotally connected to the ground frame $l^1$ by means of the pivots or hinges $l^2$, and the crosshead $l^3$ of the standard $l$ carries the before descriped oscillating saddles $k$ for supporting the track ropes $j$. The standard $l$ is provided with a light strutted rod or rail $l^4$, said rail $l^4$ being for the purpose of supporting the track ropes $j$ when the track system is in the before described collapsed position, and thus to insure that the track rope $j$ shall have a fair lead or leverage when commencing to raise the track support $l$ from the ground. The track ropes $j$, shown coming from the left of Fig. 2, are supported and retained in the left halves of the saddles $k$ and pass under the crosshead $l^3$ and continue by crossing on each other to the rope grips $j^{10}$, said rope grips $j^{10}$ being secured to screw adjustment anchorage ties $j^{11}$, which in turn are made fast to suitable anchorages in the ground. The track ropes $j$, shown to the right of the figure, are supported and retained in the right halves of the saddles $k$ and lead to the center of the crosshead $l^3$ where their ends are coupled in a screw rope coupling $j^{15}$.

It will be readily understood that the saddles provide the means for making convenient other suitable modes for the securing of the sectional or span lengths of rope; therefore, I do not confine my invention to the methods herein described of utilizing the means provided.

Ground wheels $l^5$ are indicated on the base frame $l^1$ and are simply for the purpose of initial portability; the base-frame $l^1$ being made to bear by displacing the said wheels $l^5$, and the base-frames may be further secured by spikes driven into the ground.

I do not confine myself to the particular shape, form or arrangement of the support $l$, or of the base-frame $l^1$, as I may employ a closed frame in either or both cases.

Having now particularly described and ascertained the nature of my said invention and in what manner the same is to be performed, I declare that what I claim is:—

1. A collapsible elevated trackway device including opposite relatively rigid terminal track units and flexible intermediate tracks connecting the same, means for anchoring one of the terminal track units, and manually controlled tensioning means associated with the other terminal unit and adapted to work in opposition to the anchoring means to hold the trackway in an elevated position.

2. A collapsible elevated trackway device including opposite relatively rigid terminal track units each supported on hinged standards, said standards being arranged to lie in oppositely inclined planes when the trackway is elevated, flexible track elements connecting the terminal track units, anchoring means for one of the terminal track units, and a manually controlled device associated with the other terminal unit for maintaining the standards of the terminal units in said oppositely inclined planes to hold the trackway in an elevated position.

3. A collapsible elevated trackway device including opposite terminal units having relatively rigid track loops and hinged standards for supporting the track loops, anchoring means for preventing the standard of one of the units from assuming a perpendicular position, and means connected to the standard of the opposite unit for permitting the same to be thrown to either side of a perpendicular plane intersecting its lowest hinging point, whereby the entire trackway may be collapsed or held elevated.

4. An elevated trackway device including opposite terminal units consisting of rigid track loops adapted to be supported in a horizontal plane, standards for hingedly supporting the track loops, and means for maintaining the said supporting standards of the opposite units in oblique relation when the trackway is held elevated.

5. An elevated trackway device including an endless trackway consisting of relatively rigid terminal loops and intermediate relatively flexible track elements, a plurality of hinged standards carrying pivotal saddles for supporting the intermediate flexible track elements, other hinged standards for supporting the relatively rigid terminal loops of the trackway, and the standards associated with one terminal loop being adapted to assume the same inclined position as the standards that support the intermediate flexible track elements, while the standards which support the other terminal loop are adapted to be inclined obliquely with reference to the other standards when the trackway is in elevated position, anchoring means for one of the terminal loops, and tensioning means for the other terminal loop.

6. An elevated trackway device including opposite terminal units each including a terminal track loop supported on hinged standards, intermediate flexible tracks connecting the ends of the track loops, anchoring cables for maintaining the track loop of one of the terminal units in a relatively fixed position and a controlling device associated with the other terminal unit, said device consisting of a windlass and cable, the latter engaging a part of the terminal unit and having a weight mounted thereon which when suspended places the entire elevated trackway under tension by working in opposition to the anchoring cable, said windlass adapted to be operated to lower the weight and permit the elevated trackway to fall.

7. An elevated trackway device including terminal hinged track supporting members, and a plurality of intermediate hinged supporting standards carrying oscillating bridging saddles connected with and supporting the intermediate sections of the trackway.

In testimony whereof I have affixed my signature this 24th day of September, 1918.

WILLIAM HUGH WATKINS.

Copies of this patent may be obtained for five cents each, by addressing the "Commissioner of Patents, Washington, D. C."